(12) United States Patent
Gretz (10) Patent No.: US 6,596,939 B1
(45) Date of Patent: *Jul. 22, 2003

(54) THREADED SNAP IN CONNECTOR (75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/034,152

(22) Filed: Dec. 26, 2001

(51) Int. Cl.[7] ................................................ H02G 3/18
(52) U.S. Cl. ................ 174/65 R; 174/152 G; 174/65 G; 439/142; 439/552
(58) Field of Search ................ 174/65 R, 50, 174/151, 845, 152 G, 153 G, 153 R; 439/142, 552, 144, 578, 411, 439, 460, 98; 403/197; 285/194, 921, 154.1, 146.1

(56) References Cited

U.S. PATENT DOCUMENTS

| | | | | |
|---|---|---|---|---|
| 4,324,503 A | * | 4/1982 | Sevrence | 403/197 |
| 4,652,018 A | * | 3/1987 | Boghosian | 285/12 |
| 4,773,280 A | * | 9/1988 | Baumgarten | 403/197 |
| 5,171,164 A | * | 12/1992 | O'Neil et al. | 439/552 |
| 5,189,258 A | * | 2/1993 | Pratesi | 174/65 R |
| 5,266,050 A | * | 11/1993 | O'Neil et al. | 439/552 |
| 5,373,106 A | * | 12/1994 | O'Neil et al. | 174/65 R |
| 5,422,437 A | * | 6/1995 | Schnell | 174/65 R |
| 5,912,431 A | * | 6/1999 | Sheehan | 174/65 R |
| 6,114,630 A | * | 9/2000 | Gretz | 174/65 R |
| 6,335,488 B1 | * | 1/2002 | Gretz | 174/65 R |
| 6,352,439 B1 | * | 3/2002 | Stark et al. | 439/142 |
| 6,355,884 B1 | * | 3/2002 | Gretz | 174/65 R |

* cited by examiner

*Primary Examiner*—Dean A. Reichard
*Assistant Examiner*—Angel R. Estrada (57) ABSTRACT

The disclosure shows an electrical connector with both a snap ring and threaded end for fastening the connector to an access hole in an electrical junction box. The snap ring has snap lock tangs to hold the connector in the box and resist pull out forces. The snap ring also has grounding tangs for grounding the connector. Also, the connector has locking tabs that are designed to be seated in apertures located in the leading end of the connector. The connector has a threaded leading end having a standard pitch, which has been truncated to a smaller diameter. As the snap ring is very thin, it can be easily stamped from thin spring steel or its equivalent and mass-produced at a low unit cost. The snap locking tangs are deflected inward as they are pushed into a typical access hole in an outlet box or electrical panel. The thinness of the snap ring wall permits the snap ring to enter the hole of the electrical junction box and lock the ring and connector together to resist being pulled out. If the installer feels the connector should be threaded into a threaded access aperture or that a standard lock nut should be installed; it is only necessary to use a screwdriver or other tool to manually remove the snap ring and expose the truncated threads. The snap ring may have the leading and trailing edges turned inward for stabilizing the snap ring.

20 Claims, 6 Drawing Sheets

THREADED SNAP IN CONNECTOR

FIELD OF THE INVENTION

The present invention relates to devices for connecting cables and electrical tubing to electrical panels or junction boxes and specifically to a device that is easier to use in a more universal manner than current connectors that are commonly used in the trade.

BACKGROUND OF THE INVENTION

It is common in the electrical industry to connect cable and electrical tubing to electrical junction boxes by means of a variety of standard threaded connectors. The exterior threaded portion of the connectors are pushed into a standard access hole in a junction box or electrical panel and held in the hole by a standard lock nut. This standard lock nut has an interior-thread, which is screwed onto the exterior-threaded electrical connector that extends into the junction box. The lock nut typically has one or more individual threads on its interior circumference to create a locking grip against the wall of the junction box. Sometimes the access hole has internal threads into which the connector is threaded. In that case, no lock nut is needed. Lock nuts used in the electrical trade are commonly formed of metal that is 0.130 inches or more in thickness.

Also, snap fitting connectors are becoming more popular in situations that do not require a threaded lock nut.

While snap fitting connectors have become important, they are still limited to those installations where a locking nut is not desired or a threaded receiver access hole are not present.

Therefore, an acceptable and versatile snap fitting connector or snap ring that can also be removed for use with threaded lock nuts or threaded receptacles is very much needed. Efforts have been made in the past to achieve these goals, but the prior efforts are not believed to have been successful.

SUMMARY OF THE INVENTION

This invention provides a snap ring and threaded electrical connector that is much easier to use in a universal and versatile manner than the current connectors used in the trade. The snap ring is stamped from a single thin piece of spring steel or its equivalent. In the stamping procedure, locking tabs are formed to define portions that are bent inward to form locks for mating with apertures or depressions located in the leading end of a special connector and portions that form snap locking tangs. The stamped piece of spring steel is formed into a circular or annular shape thereby creating a ring shaped snap ring with snap locking tangs slanted to the rear and outward to snap in an access hole in an electrical junction box to prevent pull out. The snap ring also has inward locking tabs around its outer periphery to lock the locking tabs to an aperture or depression in the forward portion of the electrical fitting. The locking tabs within the snap ring are sized, positioned and shaped to fit into the mating aperture or depression in a manner it cannot be pulled forward or, in some instances, rotated relative to the connector. As used herein, the aperture or depression is defined to include an opening or a locking recess or depression as the depression can be either open at the bottom or have a bottom wall and can be located within the body of the screw threads and/or at an end of the screw threads. The thickness of the snap ring and its shape is critical as it must fit into the space between the outside diameter of the threaded portion of the connector with standard or nominal threads and the inside diameter of the standard access holes in the electrical junction box or panel. Grounding tangs are also lanced rearwardly and outwardly to provide a grounding contact. The snap ring may have stabilizing locking tabs that are received in depressions with or without a locking tab.

To apply the snap ring with the threaded connector in one embodiment, the snap ring is placed over the threaded leading end with the locking tabs located in the locking apertures. The assembled connector and snap ring is then ready for use. When used, the installer simply h a s to insert the assembled connector into the access hole in the junction box until the flange prevents further insertion. During insertion, the snap locking tangs are forced inwardly by the sidewalls of the junction box hole until the tangs are completely through the hole at which time they snap back and prevent withdrawal. This is a single hand job and makes installation efficient and easy, even in difficult positions. The invention permits the use of the special connector of the invention with standard cable and electrical tubing with standard electrical junction boxes having standard holes. As used herein, electrical junction boxes includes regular electrical junction boxes as well as devices and appliances that have threaded or non-threaded access holes.

In the event, it is desired to remove the snap ring, such can readily be done by a screwdriver or other tool or manually to unlock and remove the ring from the remainder of the fitting. This exposes the screw thread for use with a standard lock nut either when there is no thread opening in an electrical box or permits the connector to be threaded into a threaded receptacle.

Other advantages of the present invention including other embodiments will be better understood from the following descriptions when read in conjunction with the appropriate drawings.

DESCRIPTION OF THE INVENTION

The present invention comprises an annular snap ring and threaded electrical connector for use with standard electrical junction boxes, including electrical panels and the like.

Figure 3:
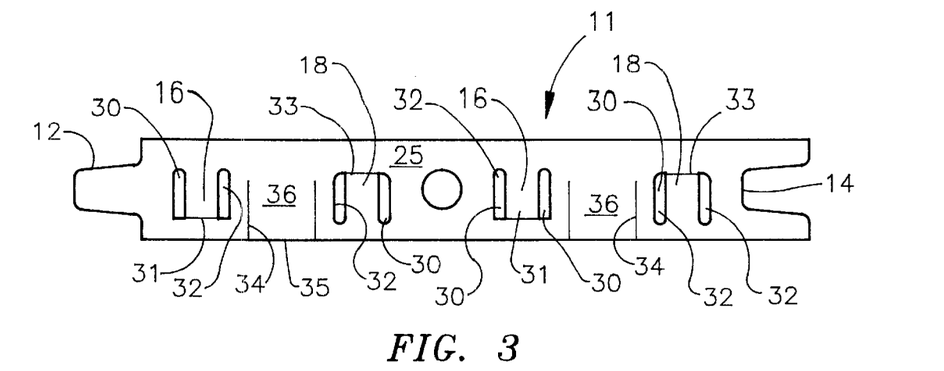
FIG. 3 is a plan view of the blank used to form the snap ring of the present invention.

With reference to FIG. 3, there is shown a plan view of the blank 11 used to form the snap ring.

The blank is typically stamped from a thin piece of spring steel, such as 1050 spring steel or equivalent, preferably 0.017 to 0.018 inches in thickness but may be 0.013 to 0.022 inches in thickness. The blank 11 has a tongue 12 on one end and a groove 14 on the opposite end. U-shaped openings 30 in the blank 11 define tabs or tangs, which are lanced from the body of the blank. The U-shaped openings have relatively wide slots 32 on each side of the tabs or tangs and a narrow slot or shear line 31 at the bottom of the U-shape. The snap locking tangs 16 are bent outwardly and rearwardly. Locking tab 18 is bent inward and forwardly. Two slits or narrow openings 34 in blank 11 define grounding tangs 36 that are bent outward and rearwardly adjacent the trailing edge 35. The flat front surface of blank 1 shown in FIG. 3 will become the outer circumference 26 when it is formed into the annular shape of the snap ring.

Figure 1:
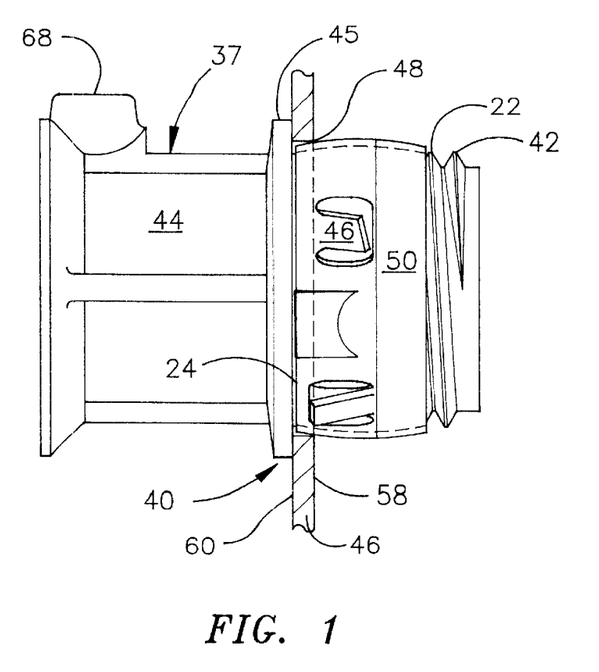
FIG. 1 is a view of the annular snap ring in place on a connector and mounted in the wall of an electrical junction box.
Figure 2:
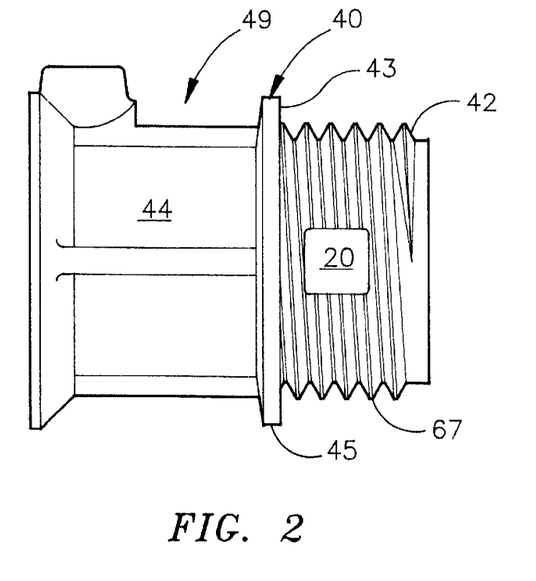
FIG. 2 is a view of the connector of FIG. 1 with the annular snap ring and junction box wall omitted.

As shown in FIG. 1, edge 22 is the forward or leading end of the snap ring facing into the interior of a junction box and edge 24 is the rearward or trailing edge facing away from the junction box.

Figure 4:
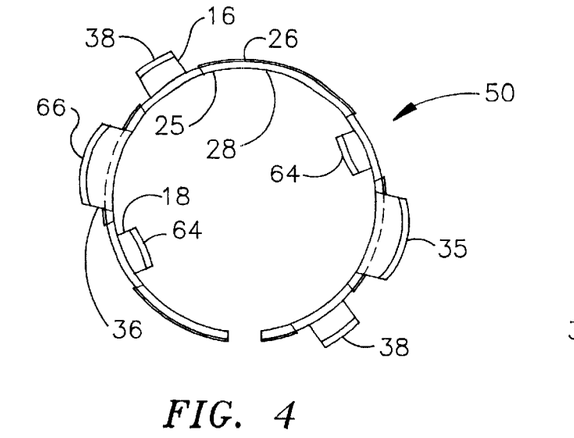
FIG. 4 is an end view of the annular snap ring formed from the blank shown in FIG. 3.

FIG. 4 depicts an end view of blank 11 after it has been formed in a circle or annular shape. Snap locking tangs 16 are angled outwardly and rearwardly from face 25. Grounding tang 36 is angled outwardly and rearwardly.

When blank 11 is formed into an annular shape, tongue 12 loosely fits into groove 14. The blank formed into an annular snap ring 50 is depicted in FIG. 4. Usually, the spring steel is heat treated after the forming operation so that the steel will have the correct properties and so that it will hold the annular shape. The blank 11 is approximately 0.375 inches wide and 2.750 inches long prior to being formed in the annular shape.

Snap locking tangs 16 with outer or abutment edges 38 extend and are angled outwardly and rearwardly from the outer circumference 26 of the snap ring 50 and are located preferably at approximately 180 degrees from each other.

The snap locking tangs form an outermost diameter of 1.00 inches for a ½ trade size connector. Except when specifically indicated otherwise herein, al dimensions are with reference to a ½-inch trade size fitting.

The locking tabs 18 are located approximately 180 degrees apart and extend inwardly and forwardly from the inner circumference 28 at the approximate angle shown. The locking tabs 18 are project typically 0.06 inches inwardly and are each approximately 0.125 inches in width.

Figure 7:
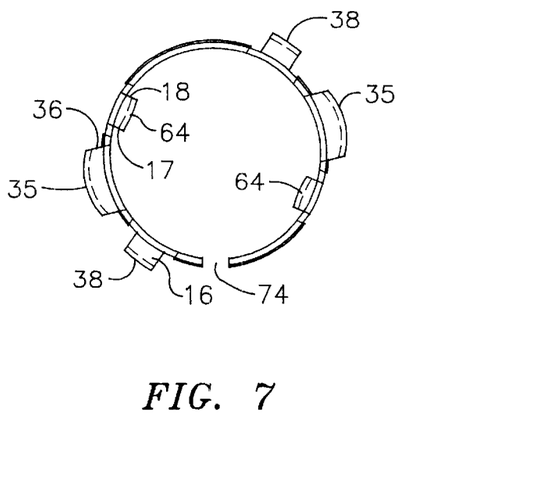
FIG. 7 is a view similar to FIG. 4 except viewed from the opposite side.
Figure 8:
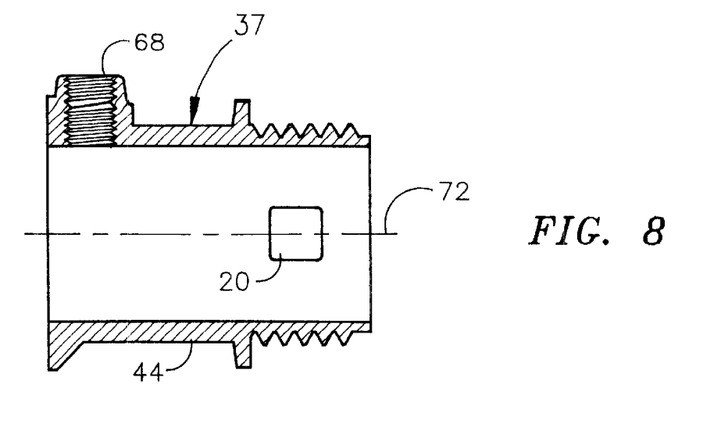
FIG. 8 is a cross-sectional view of the connector of FIG. 2.
Figure 9:
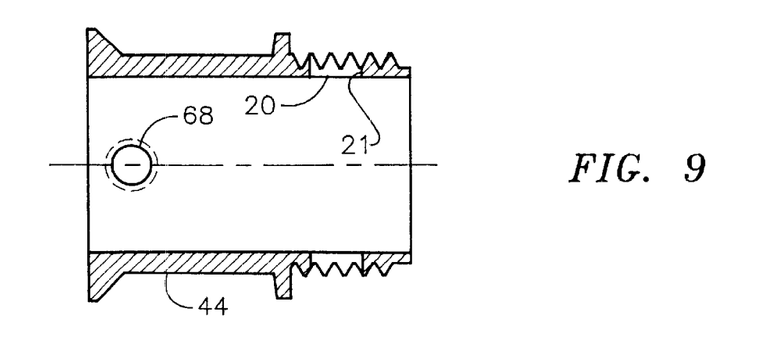
FIG. 9 is a cross-sectional view of the connector of FIG. 8 but rotated ninety degrees.
Figure 10:
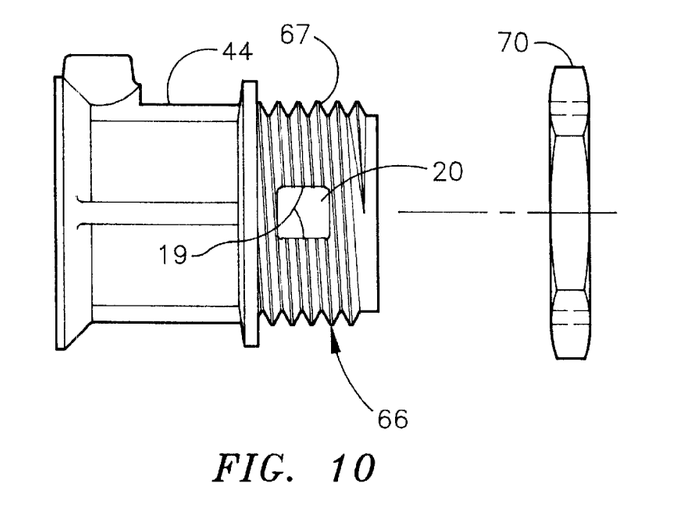
FIG. 10 is a view similar to FIG. 2 but showing a lock nut prior to being assembled to lock the connector into position.

As shown in FIGS. 1 and 8 to 10, the locking tabs 18 drop into the apertures or depressions 20 so that the abutment edge contacts the vertical or forward wall 21 so that the snap ring is prevented from linear movement with respect to the connector in the forward or leading direction. The snap ring is prevented from linear movement in the opposite direction by the forward wall 43 of flange 45. As shown in FIGS. 7 and 10, the locking tabs 18 are also prevented from rotating relative to the connector by the side walls 17 of the locking tabs 18 being in contact with the vertical side walls 19 of the apertures 20. Thus, the snap ring is locked onto the connector unless a tool or fingers are used to raise the locking tab 18 out of the aperture.

FIG. 1 depicts the annular snap ring 50 and connector 40 fastened to an electrical junction box wall 46. To apply the snap ring 50, it is first mounted on the external threaded end 42 of the connector 40.

The connector 40 has a trailing end 37. The connector represents the entire range of various electrical connectors that may be used for clamping a cable or conduit. For illustrative purposes, there is shown a body 44 with a threaded screw hole 68 for receiving a clamping screw as one form of electrical connector.

The abutment edge 64 of locking tabs 18 engage the forward wall 21 (See FIG. 9) of apertures or depressions 20 located in the leading end of the connector. The sides 19 (See FIG. 10) of the aperture 20 keep the locking tabs 18 from rotating relative to the connector 40. The aperture is approximately 0.020 inches wide and 0.020 long and may be bottomless or may have a thin bottom.

As the connector 40 and snap ring 50 is pushed into the access hole or knock-out 48, the locking tangs 16 are forced inward toward the central axis of the annular snap ring. The spring steel material of construction of the snap ring 50 allows the locking tangs to flex inwardly toward the central axis. When the snap ring 50 is advanced sufficiently into the access hole 48, the locking tangs spring outward as their abutment edges 38 pass completely through the electrical junction box wall 46. As a result, the connector 40 is locked tightly into place on each side of the wall 46 between the forward wall 43 of flange 45 of the connector 40 on one side abutted with the outer surface 60 of the junction box wall 46 and the locking tangs 16 abutted with their abutment edges 38 against the inner surface 58 of the junction box wall 46.

When installed in a junction box, as depicted in FIG. 1, the leading edge 22 of the snap ring is inside the junction box and the outer or trailing edge 24 is within the confines of the access hole 48 and facing flange 44 of the connector. The grounding tangs 36 extend outward approximately 0.020 inches and are forced inward by the inside wall of access hole 48 so that the trailing grounding edge 35 of the grounding tang makes firm contact within the side walls of the access hole 48 of the electrical junction box. The connector is highly resistive to pull out forces when the connector 40 and snap ring 50 are locked in place.

The outer diameter of the annular snap lock ring in its relaxed or unstretched shape is preferably circular and, as measured from its outer surface 52, is approximately 0.875 inches in diameter for ½-inch nominal trade size threads. The dimensions of the snap locking ring mentioned herein are for use with a threaded connector having ½ inch NPS (National Pipe Straight) or NPT (National Pipe Taper) trade size threads.

Figure 5:
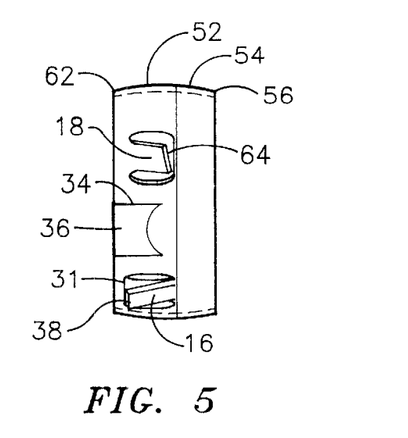
FIG. 5 is a side view of FIG. 4 with the leading end on the right.
Figure 6:
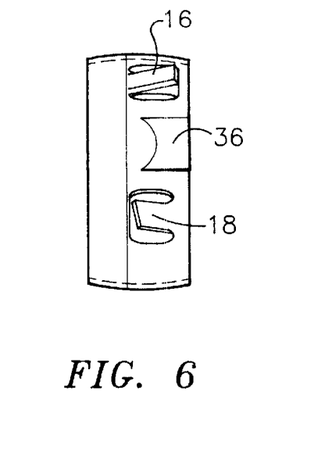
FIG. 6 is a side view of FIG. 5 with the trailing end on the right.

As seen in FIG. 5, the ring is optionally slightly bowed outward with a dividing line 54 for the outward bow approximately 0.145 inches from the right end. The outside diameter of the leading end 56 has an outward diameter of approximately 0.836 inches and the outside diameter of the trailing end 62 is approximately 0.836 inches.

With reference to FIG. 10, there is shown the connector of this invention with nominal size threads 66, which have been slightly truncated at 67. The threads are of standard pitch and depth but the slight truncation at 67 which is flat or slightly rounded to reduce the normal maximum diameter of the threaded portion. This is typically approximately 1/32" in width. As used herein a truncated thread is meant to be a nominal trade size thread which has the crest of the thread slightly flattened or rounded to reduce the major diameter. Otherwise, the thread is unchanged and when the snap ring is removed, can be readily threaded into the threaded opening of a junction box or can be used with a standard lock nut 70.

The nominal knockout or access hole for an electrical junction box is 0.875 inches in diameter. Usually the manufacture provides an opening 0.870 to 0.880 inches in diameter. However, the access hole can be as small as 0.859 inches in diameter (including tolerances).

The snap ring could be constructed for other standard trade size threads by scaling these dimensions appropriate to the nominal trade sizes such as for nominal trade sizes ¾ inch or 1 inch.

Figure 11:
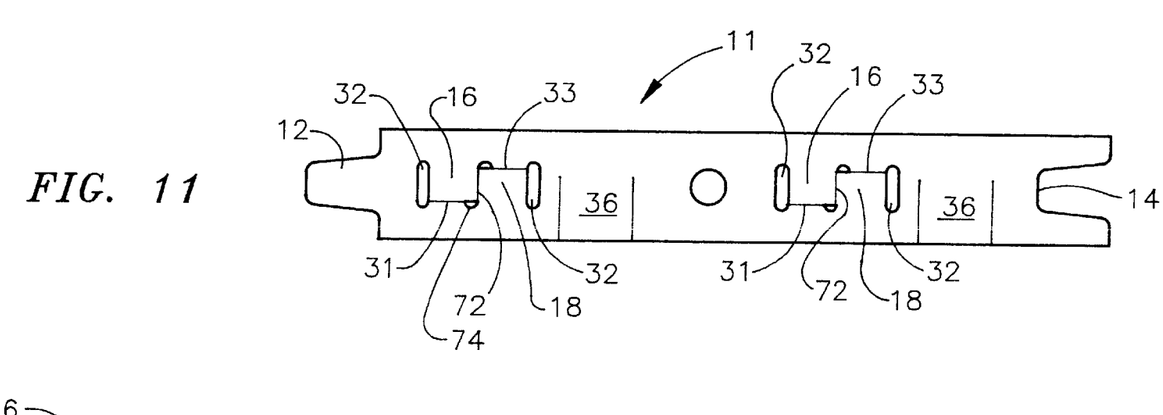
FIG. 11 to 13 show an alternative embodiment similar to FIGS. 3 to 5.
Figure 12:
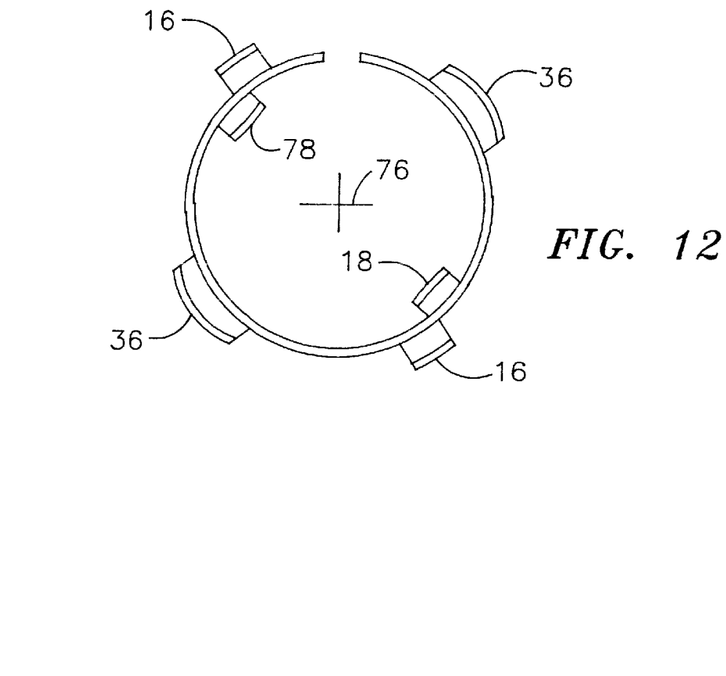
Figure 13:
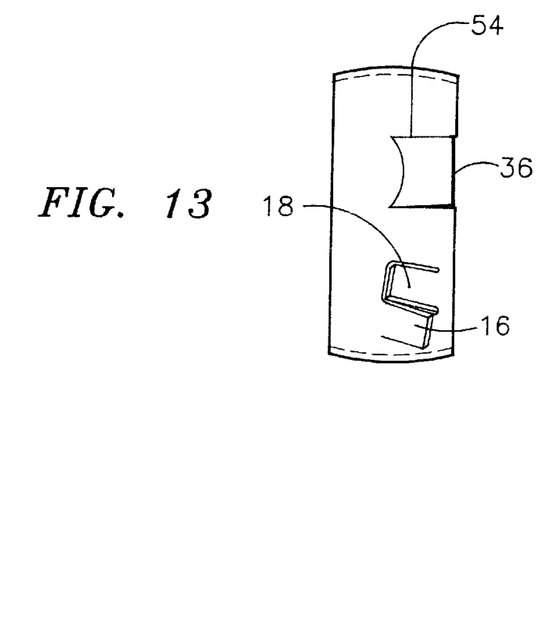

With references to FIGS. 11, 12 and 13, there is shown views similar to FIGS. 3, 4 and 5 and similar numbers are used. The alternative embodiment of FIGS. 11 to 13 is shown where the snap locking tang 16 and locking tab 18 share a common shear line 72 which defines a narrow separation line. There is also provided a small half-circular cutout 74 at each end of the shear line located adjacent narrow slot 31 and 33, respectively. A singular relatively wide slot 32 is provided adjacent each snap locking tang 16 and locking tab 18 on the opposite side from common shear line 72. Shown on FIG. 12 is the central axis 76 of the snap ring.

The nominal major diameter of the threads 66 is normally approximately 0.803 to 0.806 inches but in actuality approximately 0.798 to 0.799 inches after this has been reduced by the truncated crest 67. This leaves sufficient space between the major truncated diameter and the minimum diameter of 0.859 inches for the access hole to accommodate the thickness of the wall of the snap ring.

As used herein, a reduced diameter thread is a trade size thread or similar size thread which will be accepted into a standard trade size threaded access opening of an electrical junction box. The best way of providing the reduced diameter is by truncation as mentioned herein but other techniques may also be envisioned such as modified threads. However, sufficient clearance between the outer surface of the threaded part and the inside diameter of a standard non-threaded access opening of an electrical junction box must be sufficient to accommodate the wall thickness of the annular snap ring 50.

Figures 14, 15, 16:
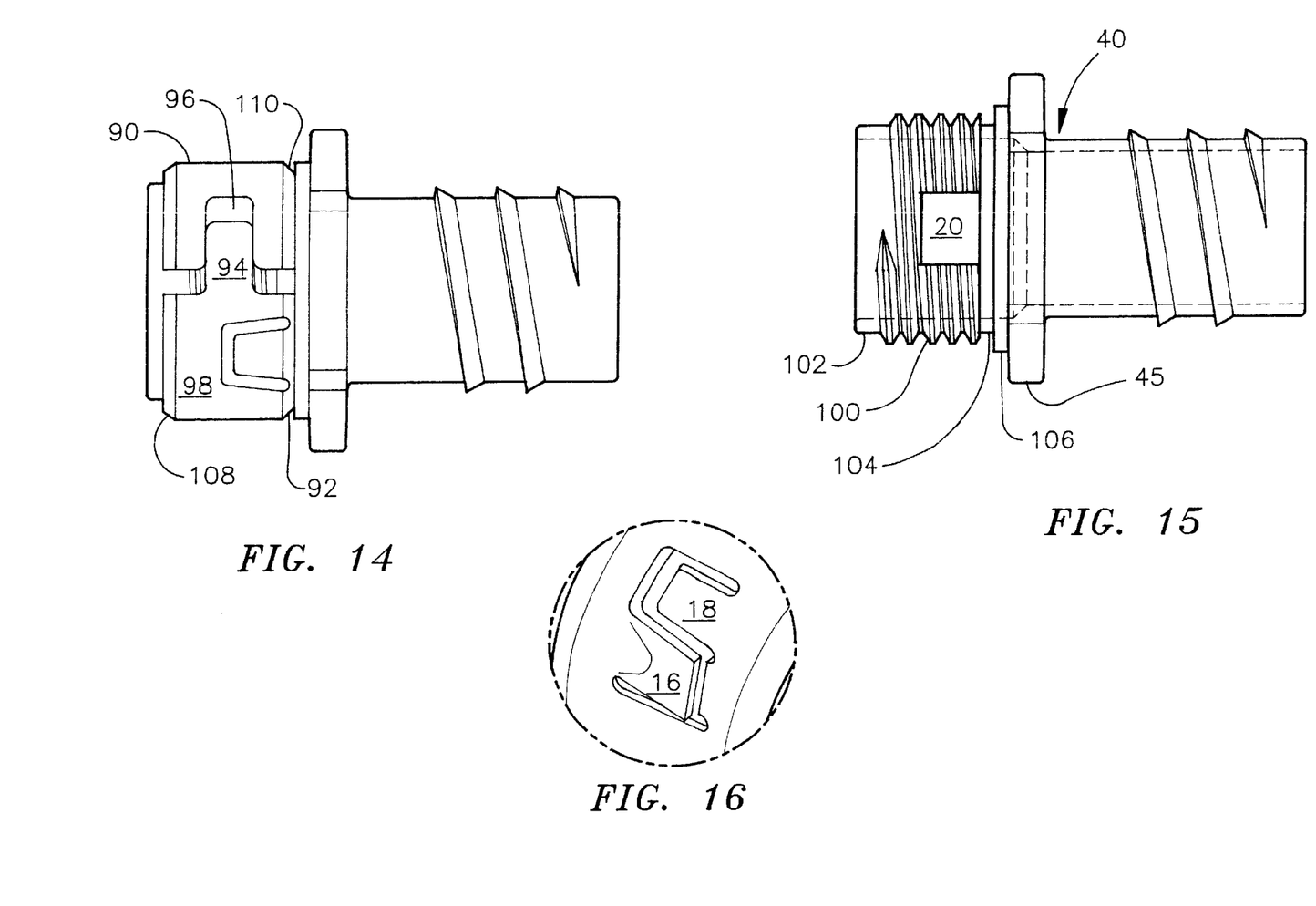
FIG. 14 to 20 show an alternative preferred embodiment similar to the other embodiments but showing a stabilizing locking ring.

The alternate and preferred embodiment of FIGS. 14 though 20 show a snap locking connector 90 having a snap ring 98 with two stabilizing cupped ends 108 and 110 which are directed inward and function as stabilizing locking tabs. The leading stabilizing locking tab is 108 and the trailing stabilizing locking tab 110 serve to stabilize and lock the snap ring 98 in its position.

Figure 19:
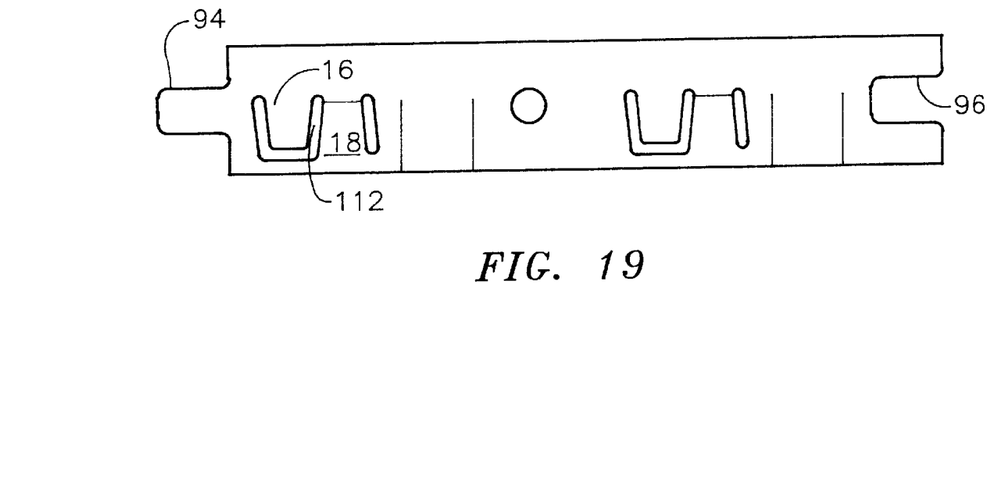

The tongue 94 and groove 96, as best seen in FIG. 14 and 19, are designed so that there is a minimum fit between the tongue and groove from side to side and the groove and tongue are generally rectangular in shape and not tapered. This helps to prevent the snap locking or snap ring 98 from being entangled when a number of them are in loose fashion prior to assembly.

With reference to FIG. 15, there is shown a connector 40 without the snap ring 98 of FIG. 14. The end portion to the right of the flange 45 are representative of any of the standard electrical connectors. But to the left, the truncated threads 100 occupy a smaller overall length than in the other embodiments. A front or leading non-threaded section or depression 102 and a rear or trailing non-threaded section or depression 104 are provided with an external diameter that is preferably the diameter of the root diameter of the threads. There is also provided a raised section 106 to accommodate gasket material. As can be seen, the threaded section is shortened in length to only that portion from the depression 104 to the depression 102.

Figures 17, 18:
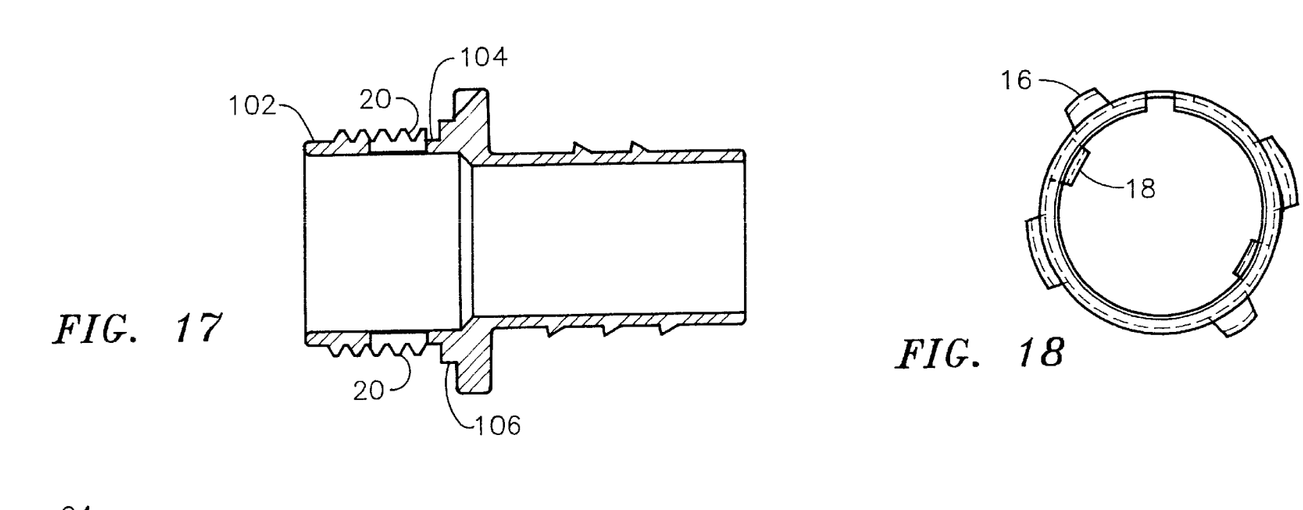

A cross-section of FIG. 15 after being rotated 90 degrees is shown in FIG. 17 which also shows part of the threads that are interrupted in order to accommodate the island for the aperture or depression 20.

Figure 20:
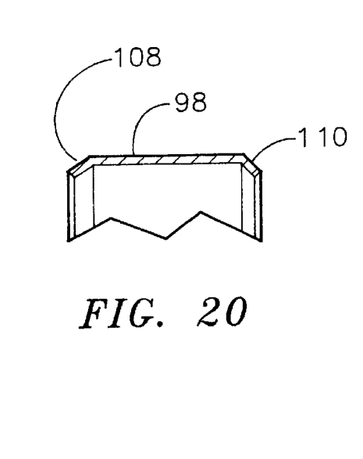

With reference to FIG. 20, there is a partial cross section of the snap ring 98 which shows the leading stabilizing cupped end 108 on the left and the trailing stabilizing angle and rest over the leading non-threaded depression 102 and trailing non-threaded depression 104. The angle may be greater including 90 degrees.

With reference to FIG. 16, there is a broken away perspective view of the arrangement of the snap locking tangs 16 and locking tabs 18. They are also shown in FIG. 19. The snap locking tang 16 and locking tab 18 are arranged side-by-side so that they have a common opening 112 between the two. The snap locking tang projects outward and the locking tab projects inward so that it can flop into the aperture or depression 20. It is found that when made with this side-by-side arrangement, the product is better than would be the case if they were separated along the periphery of the spring steel strip.

FIG. 18 shows an end view of the snap ring 98 and indicates a stabilizing cupped end locking tab 108, grounding tangs 36, snap locking tangs 16 and locking tabs 18.

FIG. 19 shows a strip of spring metal with tongue-in-groove 94, 96 snap locking tangs 16, locking tabs 18 and grounding tangs 36 before it is formed in to the circle with stabilizing cupped end locking tabs as shown in FIG. 18.

It will be readily apparent to one skilled in the art that the embodiment of FIG. 14 to 20 is similar to the embodiments of the other figures and serves the same function and purposes except for the obvious differences and especially the stabilizing cupped ends locking tabs. The stabilizing locking tabs 108, 110 serve to better hold the snap ring 98 in a better position.

Various references herein such as bent inward and so forth are with reference to the longitudinal axis of the snap ring or the connector as the case may be.

This application relates to and includes by reference the entire disclosure of pending U.S. application Ser. No. 09/565,724 filed May 5, 2000.

Having thus described the invention, it is to be understood that the invention is not to be limited by the description herein but is defined as follows by the appended claims.

Thus, the invention defines a versatile threaded snap in connector that is readily utilized by electricians to connect cable and electrical tubing to electrical junction boxes by the easily applied snap in feature; but, at the same time can be utilized to make the connection by lock nut or by threaded access holes. To expose the threads for the threaded connection, it is only necessary to remove the snap ring. Because of this arrangement, the electrician can minimize his connectors for a job.

What is claimed is:

1. A threaded snap in connector for attachment to an electrical junction box:

A connector having a trailing end portion;

A leading end portion on said connector having a leading edge;

A flange separating said trailing end portion from said leading end portion;

A first depression on said leading end portion near said flange;

Threads on said leading end portion;

A second depression on said leading end portion adjacent said leading edge of said leading end portion;

A third depression located in said leading end portion;

A removable annular shaped metal snap ring with a leading edge and a trailing edge surrounding said leading end portion;

Inward turned portions on said leading edge portion and said trailing edge portion of said snap ring;

A locking tab on said snap ring extending inwardly from said snap ring into said third depression to prevent said snap ring from being removed in a linear forward direction from said threaded portion; and A snap locking tang on said snap ring and extending outwardly to resist the connector from being pulled from an electric junction box.

2. The connector of claim 1 where said annular shape snap ring has a first end in the form of a tongue and a second end in the form of a groove with said two ends meeting each other to complete the annulus.

3. The connector of claim 1 where said annular shaped snap ring has a thickness of from approximately 0.013 to approximately 0.022 inches.

4. The connector of claim 1 where said annular shaped snap ring has a thickness of from approximately 0.017 to approximately 0.018 inches.

5. The connector of claim 1 where said annular shaped snap ring has a grounding tang extending outward and rearwardly of said trailing edge of said annular shaped snap ring.

6. The connector of claim 1 where said locking tab is angled inwardly and forwardly.

7. The connector of claim 6, wherein said depression further includes:

A vertical forward wall in said third depression;

An abutment edge at the end of said locking tab; and

Said abutment edge abutting said vertical forward wall to prevent said annular shaped snap ring from moving forward in a linear direction.

8. The connector of claim 7, which further includes:

Two opposite side walls in said third depression;

Two opposite side walls on said locking tab; and

Said side walls on said locking tab adjacent said side walls in said third depression to prevent said annular shaped snap ring from rotating relative to said connector.

9. The connector of claim 1, which further includes:

Said locking tab is angled inwardly and forwardly with two sides;

Said snap locking tang is angled outwardly and rearwardly with two sides; and

An opening adjacent to and shared between said locking tab and said snap locking tang.

10. The connector of claim 1, wherein said threads are truncated normal trade size threads.

11. The connector of claim 1 wherein said leading end portion has a small raised portion between said flange and said turned inward portion of said trailing edge of said snap ring.

12. An electrical junction box connector comprising:

An electrical junction box having an access hole with an inside wall of a standard trade size;

A threaded snap in connector attached to said electrical junction box through said access hole;

A trailing end portion on said connector;

A leading end portion on said connector;

A flange separating said trailing end portion from said leading end portion;

A first depression on said leading end portion near said flange;

A second depression on said leading end portion adjacent said leading edge of said leading end portion;

Threads on said leading end portion;

A third depression located in said leading end portion;

A removable annular shaped snap ring with a leading edge and a trailing edge surrounding said leading end portion;

Inward turned portions on said leading edge and said trailing edge of said snap ring;

A locking tab on said snap ring extending inwardly from said snap ring into said third depression to prevent said snap ring from being removed in a linear forward direction from said leading end portion; and A snap locking tang on said snap ring and extending outwardly to resist the connector from being pulled from said electric junction box.

13. The junction box connection of claim 12 has a first end in the form of a tongue and a second end in the form of a groove with said two ends meeting each other to complete the annulus.

14. The junction box connection of claim 12 where said annular shaped snap ring has a thickness of from approximately 0.013 to approximately 0.022 inches.

15. The junction box connection of claim 12 where said annular shaped snap ring has a thickness of from approximately 0.017 to approximately 0.018 inches.

16. The junction box connection of claim 12 where said annular shaped snap ring has a grounding tang extending outward and rearwardly of said trailing edge of said annular shaped snap ring with said grounding tang in electrical contact with said inside wall of said access hole.

17. The junction box connection of claim 12 where said locking tab is angled inwardly and forwardly.

18. The junction box connection of claim 17 which further includes:

A vertical forward wall in said third depression;

Two opposite sidewalls on said locking tab;

An abutment edge of the end of said locking tab;

Two opposite sidewalls on said locking tab;

Said abutment edge abutting said vertical forward wall to prevent said annular shaped snap ring from moving forward in a linear direction; and Said side walls on said locking tab adjacent said side walls in said third depression prevent said annular shaped snap ring from rotating relative to said connector.

19. The junction box connection of claim 13 wherein said tongue and said groove are substantially rectangular with closely facing side walls that slide past one another.

20. A method of making an electrical junction box connection including the following:

Providing an electrical junction box having a wall and an access hole, with an inside wall in the access hole of a standard trade size;

Providing a threaded snap in connector having a leading end portion and a trailing end portion a flange, separating the trailing end portion and said leading end portion and threads and a depression on the leading end portion;

Providing a removable annular shaped snap ring surrounding the leading end portion with inwardly turned portions on the leading edge and trailing edge;

Providing a locking tab on said snap ring angled inwardly and forwardly and entering the depression to prevent the snap ring from moving forwardly with respect to the connector and to prevent rotation with respect to the connector;

Providing a snap locking tang on the snap ring angled rearwardly and outwardly;

Determining whether to use a threaded connector or a snap ring for holding the connector to the junction box;

If the decision is to use a snap ring:
  Pushing the connector toward the access hole with the snap locking tang being forced inward until the junction box wall is cleared and snap locking the connector to the junction box;
If the decision is to use a threaded connector:
  (1) Removing the annular ring by lifting the locking tab out of the depression;
  (2) Providing either an access hole with a threaded opening or a threaded lock nut; and
  (3) Screwing the connector into the threaded access hole or pushing the connector into the access hole and holding in place by a locking nut.

\* \* \* \* \*